United States Patent
Tseng

(10) Patent No.: US 6,304,673 B1
(45) Date of Patent: Oct. 16, 2001

(54) METHOD AND DEVICE FOR AUTOMATIC MATCHING OF SEAL PRINTS

(76) Inventor: Shou-Min Tseng, No. 32 Jin-Men-Shin-Cheng, Bade City, Taoyuan Hsien (TW)

( * ) Notice: Subject to any disclaimer, the term of this patent is extended or adjusted under 35 U.S.C. 154(b) by 0 days.

(21) Appl. No.: 09/205,359

(22) Filed: Dec. 4, 1998

(51) Int. Cl.[7] .............. G06K 9/00; G06K 9/62; G06K 9/36
(52) U.S. Cl. ............ 382/218; 382/100; 382/181; 382/209; 382/288
(58) Field of Search ................... 382/115, 135, 382/185, 187, 218, 137, 181, 209, 219, 100, 288

(56) References Cited

U.S. PATENT DOCUMENTS

| | | | |
|---|---|---|---|
| 4,461,028 | * 7/1984 | Okubo | 382/115 |
| 4,464,786 | * 8/1984 | Nishito et al. | 382/135 |
| 4,506,914 | * 3/1985 | Gobeli | 283/70 |
| 5,265,174 | * 11/1993 | Nkatsuka | 382/189 |
| 5,392,367 | * 2/1995 | Hsu et al. | 382/228 |
| 5,621,810 | * 4/1997 | Suzuki et al. | 382/135 |
| 5,636,291 | * 6/1997 | Bellegarda et al. | 382/187 |
| 5,960,112 | * 9/1999 | Lin et al. | 382/218 |

* cited by examiner

Primary Examiner—Leo Boudreau
Assistant Examiner—Daniel G. Mariam
(74) Attorney, Agent, or Firm—Bacon & Thomas, PLLC

(57) ABSTRACT

A method and device for automatic matching of seal prints abstracts feature points of a seal print by finding centers of mass of a number of selected areas of the seal print and processing the centers of mass as feature points thereof.

11 Claims, 4 Drawing Sheets

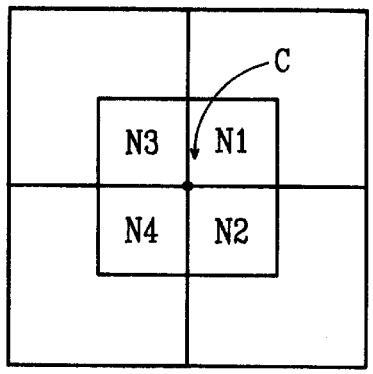
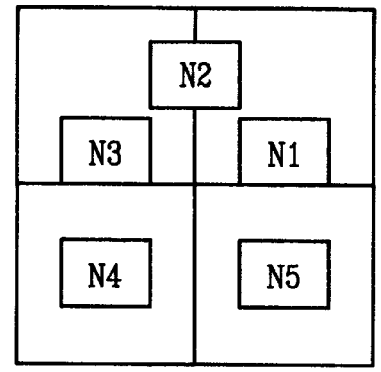
FIG. 3(a)　　　　　FIG. 3(b)
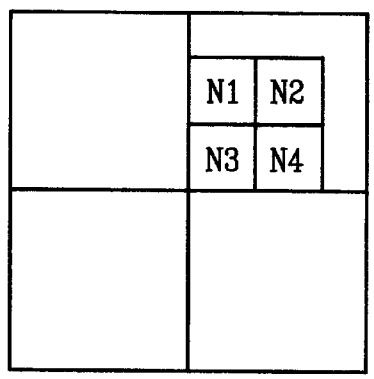
FIG. 3(c)
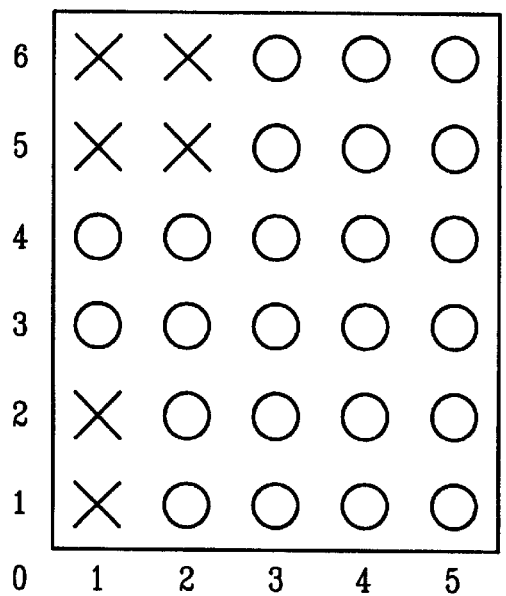
FIG. 4

METHOD AND DEVICE FOR AUTOMATIC MATCHING OF SEAL PRINTS

FIELD OF INVENTION

The present invention relates to a method and device for automatic matching of seal prints, and especially to a method and device for matching seal prints with computerized equipment.

BACKGROUND OF INVENTION

The seal is a useful tool for the identification of a person in the Chinese and the Japanese society. A seal always contains a frame and several characters. The characters represent the name of a person or other expressions. Sometimes the characters are printed positively and sometimes are printed reversed. A seal print is attached to a document after the document is prepared to make it a formal one. In many cases, the seal print is deemed equal to or more important than the signature of a person. When a seal is printed to a document, the color of the seal print is always red or pink. Most documents are not written or printed in red color. Therefore, the seal print or prints on a document are obvious to readers of the document.

An automatic matching device for seal prints is desirable in locations where a large quantity of seal prints shall be identified. Take the bank as an example. When a customer of a bank opens a savings account in the bank, the customer is required to register a sample seal print at the bank. When the customer withdraws money from the account, he will be required to print the same seal on the notice of withdrawal. A teller of the bank will then compare the seal print with the sample seal print and decide whether the two seal prints are identical (or are from the same seal). When they are decided to be identical or matched, the customer will be allowed to withdraw the money.

Two kinds of automatic matching devices for seal prints have been developed and provided to help the bank tellers to match seal prints:

Semi-automatic matching device: The sample seal prints are stored in the matching device. When a seal print is to be matched, its corresponding sample seal print is retrieved and its image is displayed on a monitor. An image capture device is used to capture the image of the seal print to be matched. The captured image is also displayed on the monitor, in a different color. The teller adjusts the position of the seal print to be matched such that two images overlap. Differences between the two images are identified and the teller decides whether they are identical according to the characteristics of the differences.

Automatic matching device: When seal prints are being matched automatically, it is never necessary to compare the whole images. The sample seal prints are stored in the matching device with their feature points. When a seal print is to be matched, its image is captured by an image capture device and its feature points are abstracted. The feature points of the seal print to be matched are then compared with that of its corresponding sample seal print. An algorithm is used to decide the similarity of the two seal prints. When the similarity value is greater than a threshold, the two seal prints are considered identical or matched.

Taiwan patent application No. 85108751 which corresponds to U.S. Pat. No. 5,960,112 disclosed an "automatic seal print matching system". This invention determines automatically whether two seal prints are from the same seal according to "similarity in image structure", "similarity in line distribution", "index of similarity" and "incompleteness". Although this invention provides accurate matching of seal prints, it requires to complicated calculations and uses large memory space. As a result, its drawbacks include long processing time and high manufacture cost.

It is thus necessary to provide a simplified method and device for automatic matching of seal prints to enhance the matching speed.

It is also necessary to provide a novel method and device for automatic matching of seal prints that uses relatively smaller memory space.

It is also necessary to provide a simplified method and device for automatic matching of seal prints that provide accurate matching results.

OBJECTIVES OF THE INVENTION

The objective of the invention is to provide a simplified method and device for automatic matching of seal prints.

Another objective of the invention is to provide a new method and device for automatic matching of seal prints that saves memory space.

Another objective of the invention is to provide a new method and device for automatic matching of seal prints that provides accurate and high-speed matching results.

SUMMARY OF INVENTION

According to this invention, an image of a sample seal print is captured and converted to a digital format, represented by gray level values of the red, blue and green components of its pixels. The red components of the image are enhanced and the boundary points of the red pixels are found. The block area defined by the boundary points is divided from the image and deemed a seal print. The feature points of the seal print are then abstracted and are recorded. In doing this, "centers of mass" of a number of selected areas of the seal print are found and deemed feature points thereof The sample seal print is rotated at a central point, each time at a predetermined angle section. Feature points at all angles are recorded.

In matching two seal prints, the seal print to be matched is captured, divided and its feature points are abstracted and recorded. The sum of distances between feature points of the seal print to be matched and the sample seal print at each rotating angle is calculated to find an optimal matching angle for the sample seal print. The sample seal print is again rotated within a range from the optimal matching angle, at a predetermined sectional angle. The difference between the seal print to be matched and the sample seal print at each sectional angle is recorded. The difference values are compared with a threshold to decide whether the two seal prints are identical.

The present invention also provides a device to automatically match two seal prints according to the above-said method.

The above and other objectives and advantages of this invention may be clearly understood from the detailed description by referring to the following drawings.

IN THE DRAWINGS

FIGS. 3(a), (b) and (c) show three different ways for the distribution of sectional blocks in which respective centers of mass are to be found.

FIG. 4 shows a sectional block in which a center of mass is to be found.

Figure 5:
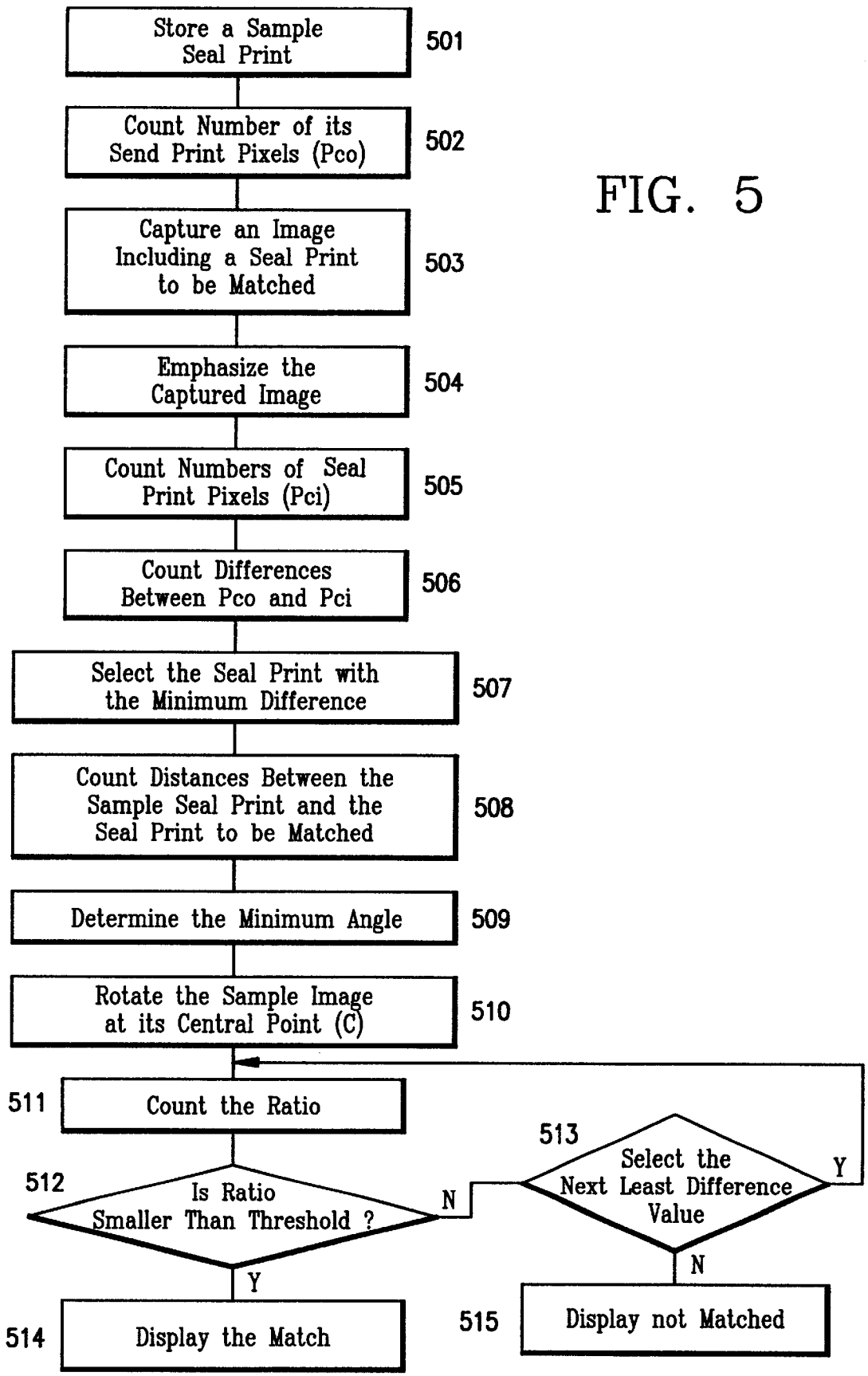

FIG. 5 illustrates the flow chart of the method for automatic matching of seal prints of this invention.

DETAILED DESCRIPTION OF THE INVENTION

Figure 1:
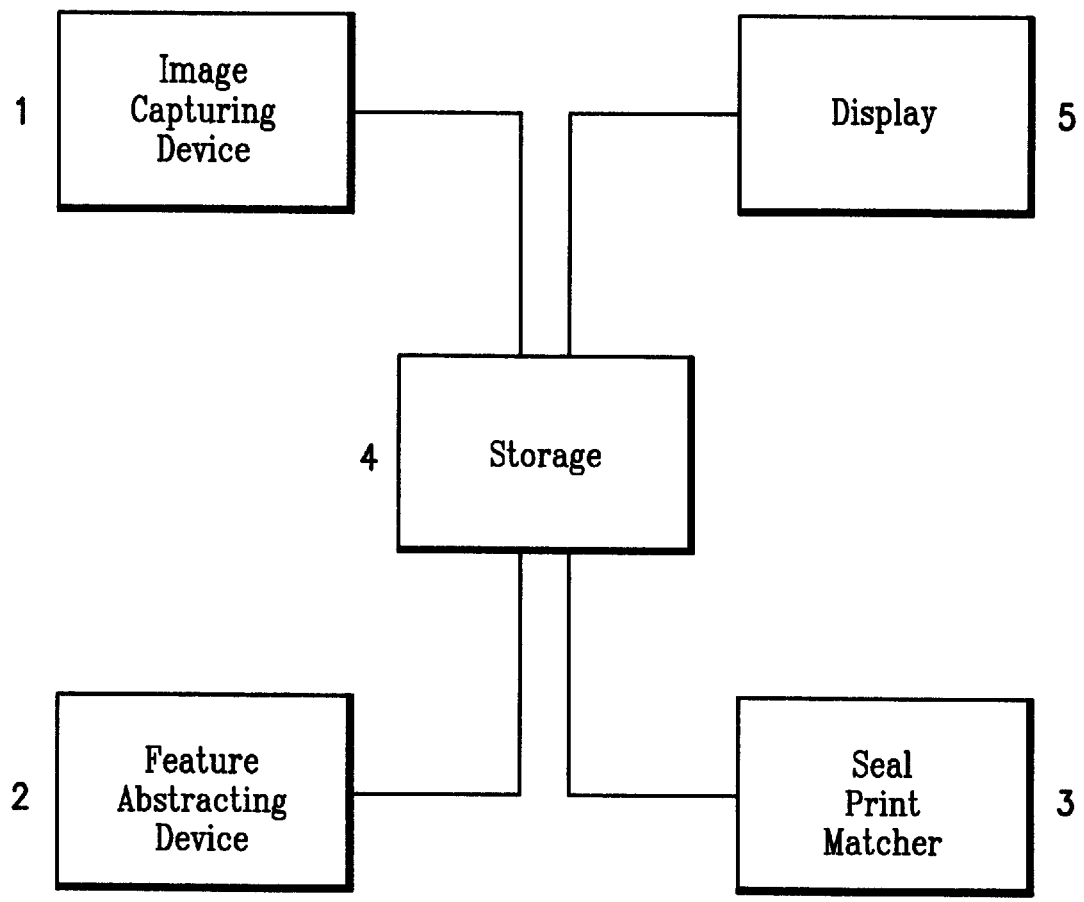
FIG. 1 illustrates the system diagram of the device for automatic matching of seal prints of this invention.

FIG. 1 illustrates the system diagram of the device for automatic matching of seal prints of this invention. As shown in this figure, the device for automatic matching of seal prints of this invention comprises an image capture device 1 to obtain the image of a sample seal print or a seal print to be matched with a sample seal print and to convert the obtained image into a digital format; a seal print feature abstracting device 2 to process the image captured by the image capture device 1 and obtain features of the images; a seal print matching device 3 to determine whether two seal prints are from the same seal according to their respective features; a memory device 4 to store the obtained images, their features, processing and results of matching and other information; and a display device 5 to display obtained images, processing and results of matching and other information of the matching processing.

Figure 2:
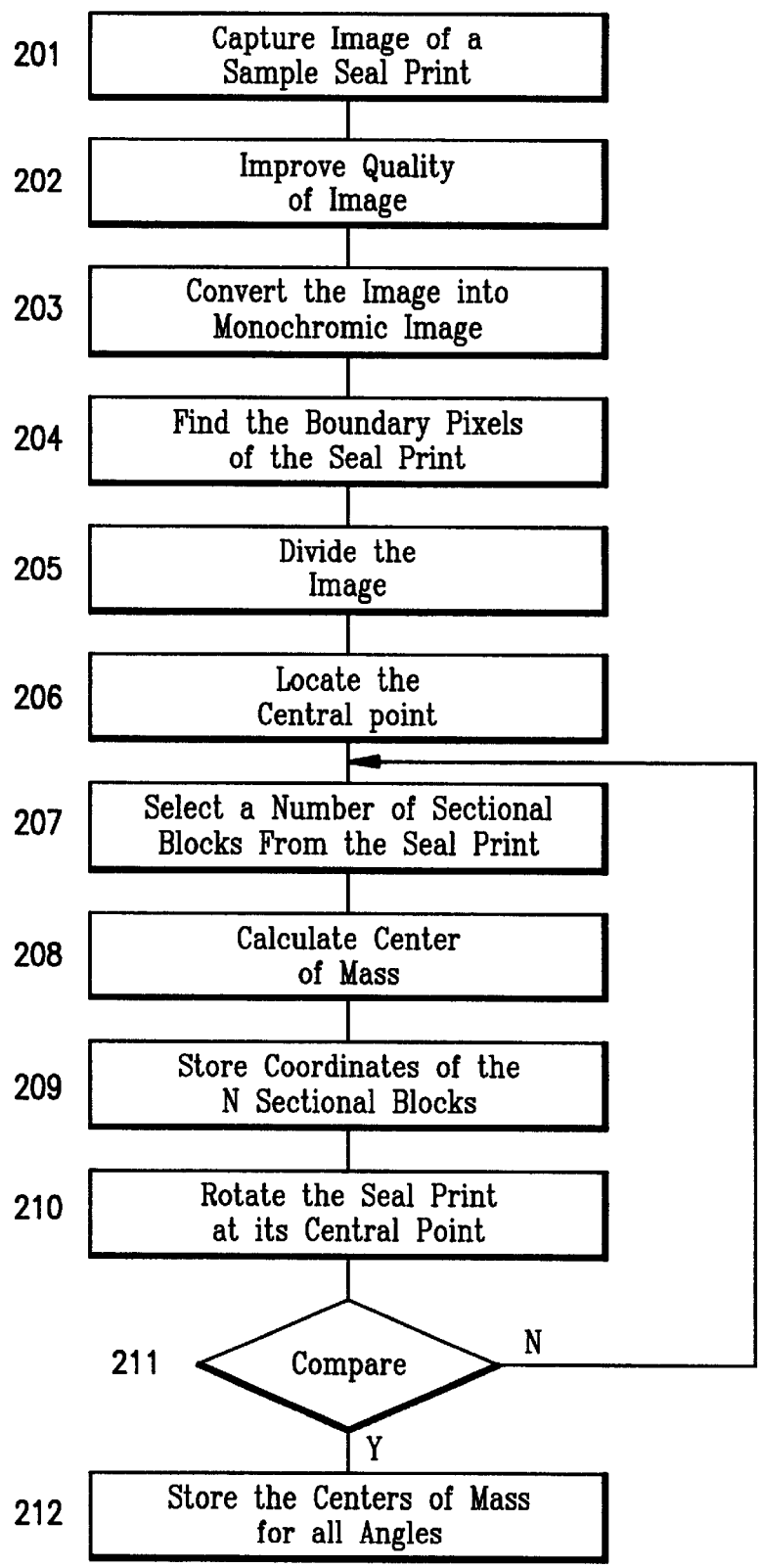
FIG. 2 illustrates the flow chart of the method for abstracting feature points for a seal print, applicable to the method for automatic matching of seal prints of this invention.

The following is a description of the method for automatic matching of seal prints of this invention. Before a seal print may be matched with a sample seal print, the sample seal print shall first be obtained and its features shall be abstracted and recorded for reference. FIG. 2 illustrates the flow chart of the method for abstracting feature points for a seal print, applicable to the method for automatic matching of seal prints of this invention.

As shown in this figure, at 201 the image capture device 1 captures the image of a sample seal print. The image capture device 1 may be a CCD camera or an image scanner. Because the seal print is always a red image on a piece of white paper, the quality of the obtained image may be improved at 202. In most cases, the captured image includes a seal print and other information contained in the recording medium. In improving the quality of the image, the red components of the captured image shall be emphasized. Suitable processing includes increasing the gray levels of the red components of the image. Taiwan patent application No. 87116659 (which corresponds to U.S. patent application Ser. No. 09/190,244, pending) discloses a "method for improvement of digitized images", invented by the same inventor. This invention is suitable for emphasizing the red components of the captured seal print and is, thus, taken for reference in the present invention. The image is then converted into a monochromic image with a conventional technology at 203. In the monochromic image, all pixels of the image are represented by "1" and "0" wherein 1's represent seal prints and 0's represent background and other information contained in the image.

In most cases, a seal print is a closed image, defined and surrounded by a red frame. After the red components of the image are emphasized, the boundary pixels of the seal print may be easily found at 204. In the embodiments of this invention, the boundary pixels may be the four pixels with the maximum and the minimum X and Y coordinates among all pixels of the red frame. In capturing a sample seal print, only a seal print will be input. In other word, only a group of red pixels will exist in the captured image. The frame and its boundary pixels will then be easily found with any conventional image processing technology. A detailed description thereof is thus omitted.

At 205, a block image (MI) within the boundary pixels is divided from the captured image and stored in the memory device 4 as the sample seal print. At 206 the central point of the block image (MI) is found. The coordinate of the central point (C) may be:

$$X\min + \frac{|X\max - X\min|}{2}, \quad Y\min + \frac{|Y\max - Y\min|}{2}$$

Wherein Xmin, Xmax, Ymin and Ymax respectively represent the four boundaries of the block image (MI).

At 207, a number (N) of sectional blocks are selected from the seal print (MI). The N sectional blocks may be distributed around the central point C. In one embodiment of this invention, N equals to 4. In another embodiment N is 5. If N is smaller than 4, it will be necessary to use other complementary means to enhance the correctness of matching. In selecting the N sectional blocks, it is recommended to have the N sectional blocks distributed in the four quadrants defined by the central point C. FIGS. 3(a), (b) and (c) show three different ways for the distribution of sectional blocks in which respective centers of mass are to be found. In FIG. 3(a), 4 sectional blocks are distributed in 4 different quadrants of the seal print. In FIG. 3(b), 5 sectional blocks are distributed in 4 different quadrants of the seal print. In FIG. 3(c), 4 sectional blocks are distributed in 1 quadrant of the seal print.

The size of the sectional block may be decided according to the requirements in the applications. In order to match accurately, it is recommended to select the sectional blocks with substantially sufficient sizes. In general cases, the minimum size of the sectional blocks may be about 30*30 pixels. A requirement for the sectional blocks will be that the size of the blocks shall be within the minimum values of the width or length of the image block (MI), after rotation of the image block (MI). In other words, the maximum size of the sectional blocks shall be less than:

$$\frac{W}{2\sqrt{2}} \times \frac{L}{2\sqrt{2}}$$

Wherein W and L represent width and length of the image block (MI) respectively.

In the embodiment of this invention, 4 30*30 sectional blocks are selected and distributed in 4 respective quadrants around the central point C, as shown in FIG. 3(a).

At 208 a "center of mass" is found from each sectional block. Although it is not intended to limit the scope of this invention, a center of mass may represent the distribution of the seal print pixels (the "1" pixels) in a sectional block.

FIG. 4 shows a sectional block in which a center of mass is to be found. In the figure, "x" represents seal print pixels (the "1" pixels) and "o" represents blank or background pixels (the "0" pixels). The coordinate of the center of mass of this sectional block (xc, yc) may be calculated from the following equation:

$$(x_c, y_c) = \left( \frac{1}{n} \sum_{all\ pixels} x_i \times \Phi(x_i, y_i),\ \frac{1}{n} \sum_{all\ pixels} y_i \times \Phi(x_i, y_i) \right)$$

Wherein xi and yi represent x and y coordinates of a pixel of the sectional block, $\Phi(xi, yi)=1$ when (xi, yi) is a seal print pixel and $\Phi(xi, yi)=0$ when (xi, yi) is a blank pixel wherein n is the number of pixels in the sectional block, and the summation is carried out for all pixels i=1 to n.

In FIG. 4 the seal print pixels are (1, 1), (1, 2), (1, 5), (1, 6), (2, 5) and (2, 6). The coordinate of its center of mass (xc, yc) is:

$$\left(\frac{1+1+1+1+2+2}{6}, \frac{1+2+5+6+5+6}{6}\right) = \left(\frac{8}{6}, \frac{25}{6}\right) = (1.333, 4.167)$$

At 209 the coordinates of the N sectional blocks are recorded in the memory device 4. For example, if N=4, and sectional blocks are {A1, A2, A3, A4}, the centers of mass are {c1,0, c2,0, c3,0, c4,0}.

At 210 the seal print (MI) is rotated at its central point C for a determined angle (for example, 1 degree) to a second angle. Steps 207–209 are repeated. Centers of mass for the second angle is obtained: {c1,1, c2,1, c3,1, c4,1}. At 211 the seal print feature abstracting device 2 determines whether the seal print has been rotated back to the original angle. If yes, the centers of mass for all angles are recorded in the memory device 4 at 212; otherwise, the seal print is rotated again and its centers of mass are obtained by repeating steps 207–209. A matrix of centers of mass under all rotation angles is obtained, as follows:

$$\begin{bmatrix} c_{1,0} & c_{2,0} & c_{3,0} & c_{4,0} \\ c_{1,1} & c_{2,1} & c_{3,1} & c_{4,1} \\ \vdots & \vdots & \vdots & \vdots \\ c_{1,d} & c_{2,d} & c_{3,d} & c_{4,d} \end{bmatrix}$$

In this matrix, if the seal print is rotated each time a degree, d=359.

This matrix is recorded at 212 as the feature points of the sample seal print.

When a new seal print is to be compared to determine whether it is from the same seal of the sample seal print, the seal print will be input to an automatic matching device The matching processes of the method for automatic matching of seal prints of this invention will be described in the following.

FIG. 5 illustrates the flow chart of the method for automatic matching of seal prints of this invention. When a new seal print is to be matched, as shown in the figure, at 501 a sample seal print (MI) stored in the memory device 4 and its features will be retrieved. At 502, number of its seal print pixels (the "1" pixels) is counted. The counted number is represented by Pco.

At 503 an image including a seal print to be matched is captured by the image capture device 1. At 504 the captured image is emphasized with respect to its red components and converted into a monochromic image. In practice, the captured image may contain a number of seal prints and other information. After being converted into a monochromic image, the image may still contain several seal prints, or groups of red pixels. In order to determine which seal print should be matched, the seal prints (or groups of red pixels) are divided from the captured image. Here we use Pi (i=0, 1, 2, . . . ) to represent the divided seal prints. At 505 numbers of seal print pixels (the "1" pixels) of these seal prints are counted. Here, we use Pci (i=0, 1, 2, . . . ) to represent the numbers of "1" pixels. At 506 differences between pco and pci are counted and the seal print with the minimum |Pco−Pci| is selected and recorded in memory device 4.

At 507 the seal print Pi with the minimum |Pco−Pci| is selected and its feature points (centers of mass) are abstracted, according to the above-said process. We then have a matrix of the feature points for the seal print to be matched, as [c'$_1$, c'$_2$, c'$_3$, c'$_4$].

At 508 the distances between feature points of the sample seal print at each rotation angle and a feature points of the seal print to be matched are counted and sum of the distances is calculated. We then have an array of sum distances DA:

DA={DA(0), DA(1), DA(2), . . . , DA(d)} wherein $$DA(i) = (c'_1 - c_{1,i})^2 + (c'_2 - c_{2,i})^2 + (c'_3 - c_{3,i})^2 + (c'_4 - c_{4,i})^2$$

wherein i denotes rotation counts of the original seal print.

Since the images to be processed are seal prints, the question of scaling may be ignored. As the centers of mass indicate the distributions of the seal print pixels (the "1" pixels), for two identical seal prints the distributions of these pixels will be very similar. The positional relations between feature points of the sample seal print and the seal print to be matched may be used to match the two seal prints directly.

At 509 the angle (OI) at which the sum of distances between feature points of the sample seal print and the seal print to be matched is minimum is found. DA(OI)=MIN (DA). At 510 the sample image is rotated at its central point C. The seal print is rotated within a determined range, at a determined angle section. In the embodiment of this invention, the sample seal print may be rotated within 5 degrees, each time at 1 degree. The difference between the seal print to be matched and the sample seal print under each rotation degree is counted. The process in counting the difference between two seal prints may include:

A. Two seal print images are overlapped at their respective central points.

B. A block defining the overlapping area of the two images, preferably within the area defined by the boundary lines of both images, is obtained.

C. The number of pixels that have different values in respective images (a "difference pixel") is counted, as follows
   i) If a pixel is "1" in the sample seal print and its corresponding pixel (the pixel with the same coordinate) in the seal print to be matched is "0", this pixel is deemed a "difference pixel", and vice versa.
   ii) If a pixel is "1" in the sample seal print and its corresponding pixel (the pixel with the same coordinate) in the seal print to be matched is "1", this pixel is deemed a "non-difference pixel", and vice versa.

D. The number of the "difference pixels" is the deemed difference between two images.

Later, at 511, the ratio ($\gamma$) of the difference to the number of seal print pixels (the "1" pixels) of the sample seal print, under each rotation angle, is counted. At 512 the obtained ratios are compared with a threshold ($\gamma$T). If any of the ratio $\gamma$ is smaller than the threshold $\gamma$T, the two seal prints are determined identical or matched. A "matched" message is output and displayed on the display device 5 at 514. Otherwise, at 513 the image with the second least |Pco−Pci| value is selected to process the matching. Steps 511–512 are repeated. If no seal print with a second least |Pco−Pci| value exists, the seal print matching device 3 outputs at 515 a "not matched" message and displays the message on the display device 5 at 515.

In the embodiment of this invention, the value of $\gamma$ may be set at 0.2. Other values may also be adopted, depending on the requirements in the application.

EFFECTS OF THE INVENTION

In order to prove the effects of this invention, seal prints sized 200*200 pixels are matched in a personal computer with a Cyrix P150 CPU and 640 MB memory. Correct matchings are obtained within 2 seconds.

The invented method does not only simplify the matching process, it is applicable to seal prints with defective corners and seal prints containing written and printed characters and other images.

As the present invention has been shown and described with reference to preferred embodiments thereof, those skilled in the art will recognize that the above and other changes may be made therein without departing from the spirit and scope of the invention.

What is claimed is:

1. A method for abstracting feature points from a seal print, comprising the following steps:

obtain a digitized image of a seal print;

locate a central point (C) of the obtained image (MI) directly;

select a number of sectional blocks from said obtained image (MI) relative to said central point;

locate a center of mass in each selected sectional block to obtain a matrix of centers of mass; and record said matrix as a matrix of feature points of said obtained image (MI);

characterized in that coordinates of said centers of mass (xc,yc) in said sectional blocks are obtained from the following equation:

$$(x_c, y_c) = \left( \frac{1}{n} \sum_{i=1 \text{ to } n} x_i \times \Phi(x_i, y_i), \frac{1}{n} \sum_{i=1 \text{ to } n} y_i \times \Phi(x_i, y_i) \right),$$

wherein xi and yi represent x and y coordinates of pixels of a sectional block in said sectional block, n is the number of pixels in the sectional block, and $\Phi(xi,yi)$ has two possible values:

$\Phi(xi,yi)=1$ when (xi,yi) is a pixel representing the seal print, and $\Phi(xi,yi)=0$ when (xi,yi) is a non-seal print pixel.

2. The method coordinates to claim 1 wherein coordinate of said central point (C) are:

$$\left( X\min - \frac{|X\max - X\min|}{2},\ Y\min + \frac{|Y\max - Y\min|}{2} \right)$$

wherein Xmin, Xmax, Ymin and Ymax respectively represent the four boundaries of said obtained image (MI).

3. The method according to claim 1 or 2, further comprising the following steps:

rotate said obtained image (MI) at said central point for a determined angle;

obtain centers of mass of said obtained image (MI) at the rotated angle until said captured image returns to its original angle; and obtain a matrix of centers of mass under all angles.

4. The method according to claim 3 wherein said obtained image (MI) is rotated each time a degree.

5. A method for automatic matching of seal prints, comprising the following steps:

obtain a digitized image of a first seal print;

locate a central point (C) of the obtained image (MI) directly;

obtain feature points of the first seal print under a plurality of rotation angles as said first seal print is rotated at its central point, and obtain a number of its pixels representing said first seal print (Pco);

obtain a second seal print and its feature points;

compare feature points of said second seal print and said first seal print at all said rotation angles to decide an optimal rotation angle for matching;

count a difference between said second seal print and said first seal print under said optimal rotation angle;

count a ratio of said difference to a number of seal print pixels of said first seal print (Pco);

determine that said two seal prints are "matched" if said ratio is smaller than a threshold;

otherwise determine that said two seal prints are "not matched"; and output a result of said determination;

characterized in that said difference between said first seal print and said second seal print comprises a number of pixels that represent a seal print in said first seal print but represent a non-seal print by represent the seal print in said second seal print, when the two seal prints are overlapped at their respective central points and when said first seal print is at said optimal rotation angle.

6. The method according to claim 5 wherein feature points of a seal print are obtained from the following steps:

select a number of sectional blocks from said seal print;

locate a center of mass in each selected sectional block to obtain a matrix of centers of mass; and record said matrix as a matrix of feature points of said obtained image (MI);

characterized in that coordinates of said centers of mass (xc,yc) in said sectional blocks are obtained from the following equation:

$$(x_c, y_c) = \left( \frac{1}{n} \sum_{i=1 \text{ to } n} x_i \times \Phi(x_i, y_i), \frac{1}{n} \sum_{i=1 \text{ to } n} y_i \times \Phi(x_i, y_i) \right),$$

wherein xi and yi represent x and y coordinates of pixels of a sectional block in said sectional block, n is the number of pixels in the sectional block, and $\Phi(xi,yi)$ has two possible values:

$\Phi(xi,yi)=1$ when (xi,yi) is a pixel representing the seal print, and $\Phi(xi,yi)=0$ when (xi,yi) is a non-seal print pixel.

7. The method according to claim 5, wherein feature points of said first seal print under a plurality of rotation angles are obtained from the following steps:

select a number of sectional blocks from said seal print;

locate a center of mass in each selected sectional block; and record said matrix as a matrix of feature points of said obtained image (MI);

rotate said first seal print at a central point for a determined angle;

select a same number of sectional blocks from said first seal print and locate centers of mass in said sectional blocks at the rotated angle until said first seal print returns to its original angle; and obtain a matrix of centers of mass as feature points of said first seal print under said rotation angles;

characterized in that coordinates of said centers of mass (xc,yc) in said sectional blocks are obtained from the following equation:

$$(x_c, y_c) = \left( \frac{1}{n} \sum_{i=1 \text{ to } n} x_i \times \Phi(x_i, y_i), \frac{1}{n} \sum_{i=1 \text{ to } n} y_i \times \Phi(x_i, y_i) \right),$$

wherein xi and yi represent x and y coordinates of pixels of a sectional block in said sectional block, n is the number of pixels in the sectional block, and Φ(xi,yi) has two possible values:

Φ(xi,yi)=1 when (xi,yi) is a pixel representing the seal print, and

Φ(xi,yi)=0 when (xi,yi) is a non-seal print pixel.

8. The method according to claim 5, 6 or 7 wherein said optimal rotation angle is decided when a sum of distances between feature points of said first seal print and feature points of said second seal print is minimum.

9. The method according to claim 5, 6 or 7 wherein said first seal print is rotated at its central point within a determined range and at a determined angle section to obtain a difference between said first seal print and said second seal print at each rotation angle and wherein said two seal prints are determined to be matched, if the ratio of said difference in any rotation angle to said number of seal print pixels of said first seal print is less than said threshold.

10. The method according to claim 9 wherein said first seal print is rotated within 5 degrees, each time at 1 degree.

11. The method according to claim 5, 6 or 7 wherein said threshold is 0.2.

* * * * *